United States Patent
Kim et al.

(10) Patent No.: US 8,797,982 B2
(45) Date of Patent: Aug. 5, 2014

(54) BASE STATIONS AND RESOURCE ALLOCATION METHODS THEREOF

(75) Inventors: Hyung Jin Kim, Chungcheongnam-do (KR); Seong Chul Cho, Daejeon (KR); Daeho Kim, Daejeon (KR); Yeong Jin Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 140 days.

(21) Appl. No.: 13/330,641

(22) Filed: Dec. 19, 2011

(65) Prior Publication Data

US 2012/0155402 A1 Jun. 21, 2012

(30) Foreign Application Priority Data

Dec. 21, 2010 (KR) ........................ 10-2010-0131461

(51) Int. Cl.
*H04W 4/00* (2009.01)
*H04L 5/04* (2006.01)

(52) U.S. Cl.
USPC .......................................... 370/329; 370/204

(58) Field of Classification Search
USPC .......................................... 370/328, 329, 338
See application file for complete search history.

(56) References Cited

U.S. PATENT DOCUMENTS

| | | | | |
|---|---|---|---|---|
| 5,235,615 A * | 8/1993 | Omura | | 370/342 |
| 5,583,851 A * | 12/1996 | Kato et al. | | 370/342 |
| 6,396,822 B1 * | 5/2002 | Sun et al. | | 370/335 |
| 6,512,753 B1 * | 1/2003 | Kim et al. | | 370/335 |
| 7,072,660 B2 * | 7/2006 | Lee et al. | | 455/447 |
| 7,489,664 B2 * | 2/2009 | Kim et al. | | 370/335 |
| 8,059,524 B2 * | 11/2011 | Bertrand et al. | | 370/203 |
| 2002/0094011 A1 * | 7/2002 | Okumura et al. | | 375/130 |
| 2002/0146029 A1 * | 10/2002 | Kavak et al. | | 370/441 |
| 2003/0193888 A1 * | 10/2003 | Sun et al. | | 370/208 |
| 2005/0013240 A1 * | 1/2005 | Gerakoulis et al. | | 370/208 |
| 2005/0063330 A1 * | 3/2005 | Lee et al. | | 370/328 |
| 2008/0219236 A1 * | 9/2008 | Love et al. | | 370/347 |
| 2009/0067382 A1 * | 3/2009 | Li et al. | | 370/330 |
| 2010/0046480 A1 * | 2/2010 | Kawamura et al. | | 370/335 |
| 2012/0257587 A1 * | 10/2012 | Esmailzadeh et al. | | 370/329 |
| 2012/0320813 A1 * | 12/2012 | Han et al. | | 370/311 |

* cited by examiner

*Primary Examiner* — Warner Wong
(74) *Attorney, Agent, or Firm* — Nelson Mullins Riley & Scarborough LLP; Anthony A. Laurentano, Esq.; Lewis Lee, Esq.

(57) ABSTRACT

Provided is a base station. The base station includes a transceiver, a frequency allocation unit, and an orthogonal code allocation unit. The transceiver communicates with a terminal. The frequency allocation unit allocates a frequency resource to the terminal through the transceiver. The orthogonal code allocation unit generates an orthogonal code index table including a plurality of orthogonal code combinations, and allocates one of the orthogonal code combinations included in the orthogonal code index table to each terminal, to which the frequency resource has been allocated for a service request of the terminal, through the transceiver not to multiply be allocated. At least one of a plurality of orthogonal codes included in the orthogonal code combination is orthogonal to at least one of a plurality of orthogonal codes included in an orthogonal code combination allocated to another terminal.

10 Claims, 5 Drawing Sheets

| Noc (1) | Noc (2) |
|---|---|
| 0 | 0 |
| 0 | 1 |
| 0 | 2 |
| 1 | 0 |
| 1 | 1 |
| 1 | 2 |
| 2 | 0 |
| 2 | 1 |
| 2 | 2 |

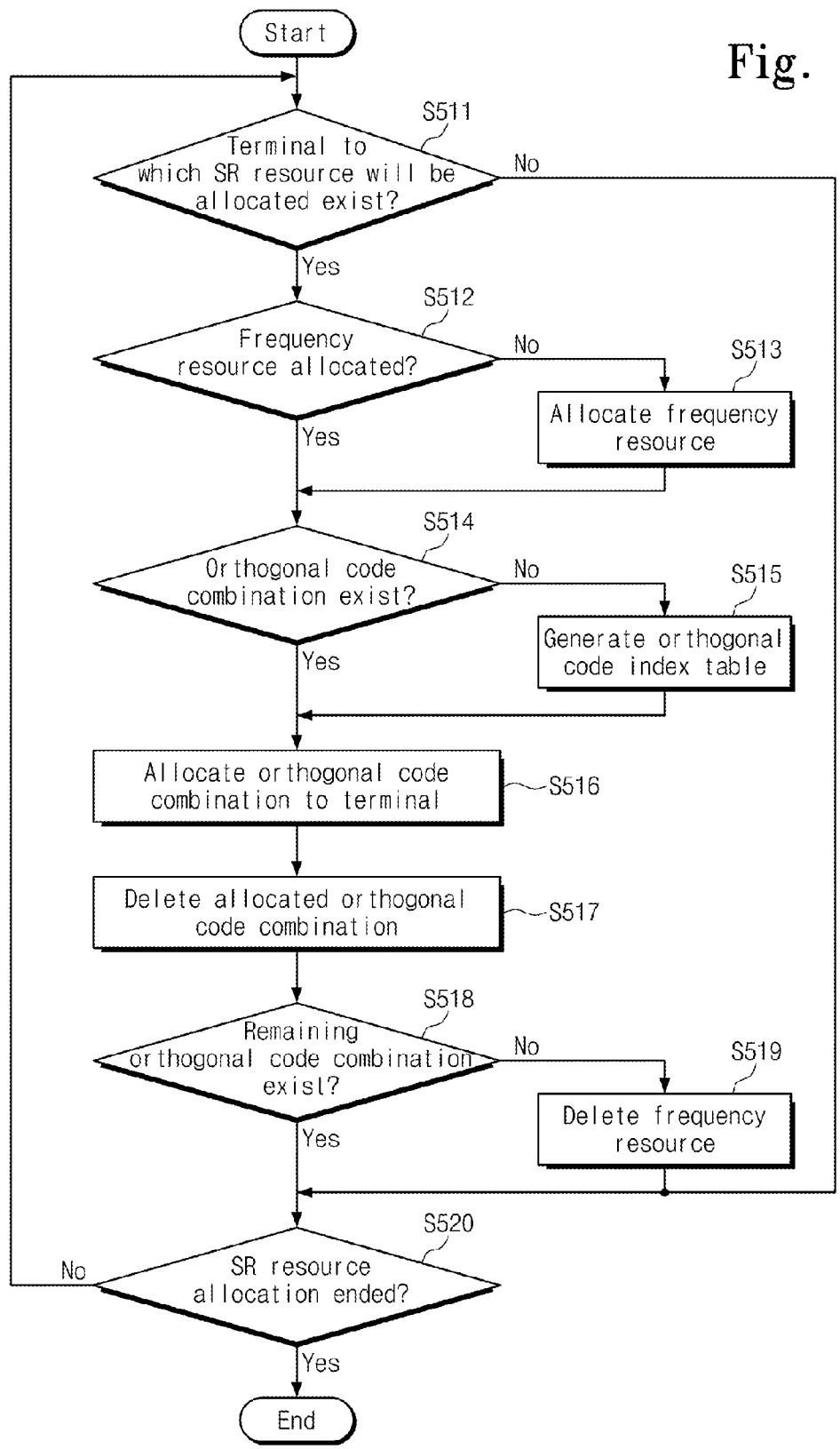

BASE STATIONS AND RESOURCE ALLOCATION METHODS THEREOF

CROSS-REFERENCE TO RELATED APPLICATIONS

This U.S. non-provisional patent application claims priority under 35 U.S.C. §119 of Korean Patent Application No. 10-2010-0131461, filed on Dec. 21, 2010, the entire contents of which are hereby incorporated by reference.

BACKGROUND OF THE INVENTION

The present invention disclosed herein relates to a communication system, and more particularly, to a base station and a resource allocation method thereof, which allocate an orthogonal code to a terminal for a service request of a terminal.

Generally, user devices are called terminals in a communication system. A terminal accesses a base station forming a cell that is an area enabling a communication service, and provides the communication service to a user.

When data to be transmitted over an upstream link exists, a terminal requests service to a base station. Herein, the service request denotes that the terminal requests resource allocation to the base station.

In this case, the base station receives service requests from a plurality of terminals, respectively. That is, the base station may receive a plurality of service requests. Therefore, interference between service requests is required to be minimized in order for a base station to normally allocate resources to respective terminals.

SUMMARY OF THE INVENTION

The present invention provides a base station and a resource allocation method thereof, which allocate a resource so as to minimize interference between service requests.

The present invention also provides a base station and a resource allocation method thereof, which minimizes a detected error of a service request signal.

The present invention also provides a base station and a resource allocation method thereof, which minimizes the alarm for a detected error of a service request signal.

Embodiments of the present invention provide a base station including: a transceiver communicating with a terminal; a frequency allocation unit allocating a frequency resource to the terminal through the transceiver; and an orthogonal code allocation unit generating an orthogonal code index table including a plurality of orthogonal code combinations, and allocating one of the orthogonal code combinations included in the orthogonal code index table to each terminal, to which the frequency resource has been allocated for a service request of the terminal, through the transceiver not to multiply be allocated, wherein at least one of a plurality of orthogonal codes included in the orthogonal code combination is orthogonal to at least one of a plurality of orthogonal codes included in an orthogonal code combination allocated to another terminal.

In some embodiments, the orthogonal codes included in the orthogonal code combination may correspond to a plurality of slots in a sub frame for a service request from a terminal, respectively.

In other embodiments, the orthogonal code may include at least one of first to third orthogonal codes, the first orthogonal code may be [+1 +1 +1 +1], the second orthogonal code may be [+1 −1 +1 −1], and the third orthogonal code may be [+1 −1 −1 +1].

In still other embodiments, the orthogonal code may include at least one of first to third orthogonal codes, the first orthogonal code may be [1 1 1], the second orthogonal code may be [1 $e^{j2\pi/3}$ $e^{j4\pi/3}$], and the third orthogonal code may be [1 $e^{j4\pi/3}$ $e^{j2\pi/3}$].

In even other embodiments, the orthogonal code allocation unit may generate the orthogonal code combinations included in the orthogonal code index table for the orthogonal code combinations to include different orthogonal codes.

In other embodiments of the present invention, a resource allocation method of a base station includes: allocating a frequency resource to a terminal; generating an orthogonal code index table including a plurality of orthogonal code combinations; and allocating one of the orthogonal code combinations included in the orthogonal code index table to each terminal, to which the frequency resource has been allocated for a service request of the terminal, through the transceiver not to multiply be allocated, wherein at least one of a plurality of orthogonal codes included in the orthogonal code combination is orthogonal to at least one of a plurality of orthogonal codes included in an orthogonal code combination allocated to another terminal.

In some embodiments, the orthogonal codes included in the orthogonal code combination may correspond to a plurality of slots in a sub frame for a service request from a terminal, respectively.

In other embodiments, the orthogonal code may include at least one of first to third orthogonal codes, the first orthogonal code may be [+1 +1 +1 +1], the second orthogonal code may be [+1 −1 +1 −1], and the third orthogonal code may be [+1 −1 −1 +1].

In still other embodiments, the orthogonal code may include at least one of first to third orthogonal codes, the first orthogonal code may be [1 1 1], the second orthogonal code may be [1 $e^{j2\pi/3}$ $e^{j4\pi/3}$], and the third orthogonal code may be [1 $e^{j4\pi/3}$ $e^{j2\pi/3}$].

In even other embodiments, the generating of an orthogonal code index table may include generating the orthogonal code combinations included in the orthogonal code index table for the orthogonal code combinations to include different orthogonal codes.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 7 is a flowchart illustrating an operation of a base station according to an embodiment of the present invention.

DETAILED DESCRIPTION OF PREFERRED EMBODIMENTS

Figure 1:
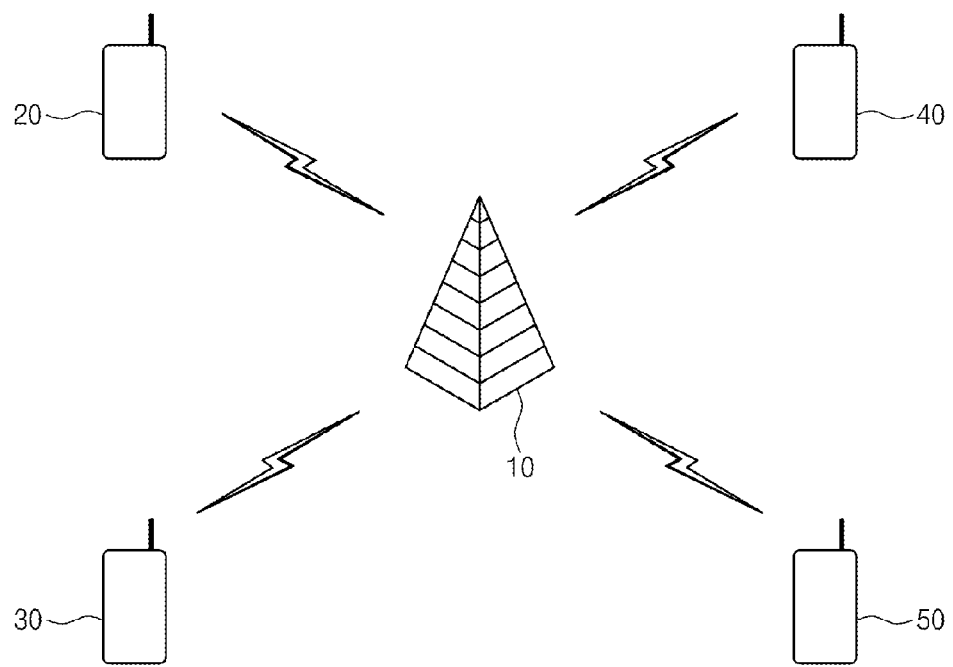
FIG. 1 is a diagram illustrating a communication system according to an embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

In the drawings, exemplary embodiments of the inventive concept are not limited to specific forms and are exaggerated for clarity. Moreover, like reference numerals refer to like elements throughout.

As used herein, the term and/or includes any and all combinations of one or more of the associated listed items. In this disclosure below, when one part (or element, device, etc.) is referred to as being 'connected/coupled' to another part (or element, device, etc.), it should be understood that the former can be 'directly connected' to the latter, or 'electrically connected' to the latter via an intervening part (or element, device, etc.). The terms of a singular form may include plural forms unless referred to the contrary. The meaning of "include," "comprise," "including," or "comprising," specifies a property, a region, a fixed number, a step, a process, an element and/or a component but does not exclude other properties, regions, fixed numbers, steps, processes, elements and/or or components.

The present invention provides a base station that allocates a resource for a service request of a terminal in a communication system. A communication system according to embodiments of the present invention, for example, is a Long Term Evolution (LTE) system that is a next generation mobile communication system proposed by 3rd Generation Partnership Project (3GPP) being an asynchronous cellular mobile communication standard organization. However, the present invention may also be applied to other communication systems where a service request may be performed with a sub frame divided into a plurality of slots.

FIG. 1 is a diagram illustrating a communication system according to an embodiment of the present invention.

Referring to FIG. 1, a communication system according to an embodiment of the present invention includes a base station 10, and a plurality of terminals 20, 30, 40, and 50.

The base station 10 may form a cell being a service providing area for communicating with the terminals 20, 30, 40, and 50. The base station 10 may communicate with the terminals 20, 30, 40, and 50 located in the cell.

The base station 10 may receive a service request message, requesting resource allocation for data transmission, from a terminal. For this, the base station 10 may allocate resources for a service request to the terminals 20, 30, 40, and 50, respectively.

When there is data to be transmitted to the base station 10, each of the terminals 20, 30, 40, and 50 transmits a service request message for resource allocation to the base station 10. For this, the base station 10 may allocate resources to the terminals 20, 30, 40, and 50, respectively.

In the present invention, since the base station 10 receives respective service request messages from the terminals 20, 30, 40, and 50, interference between the service request messages may occur. Therefore, the base station 10 allocates respective orthogonal codes, which are orthogonal between the terminals 20, 30, 40, and 50, to the terminals 20, 30, 40, and 50 such that interference does not occur in allocating a resource.

As an example, respective orthogonal codes that are not orthogonal between the terminals 20, 30, 40, and 50 are allocated to the terminals 20, 30, 40, and 50, and thus, interference between service request messages does not occur.

Figure 2:
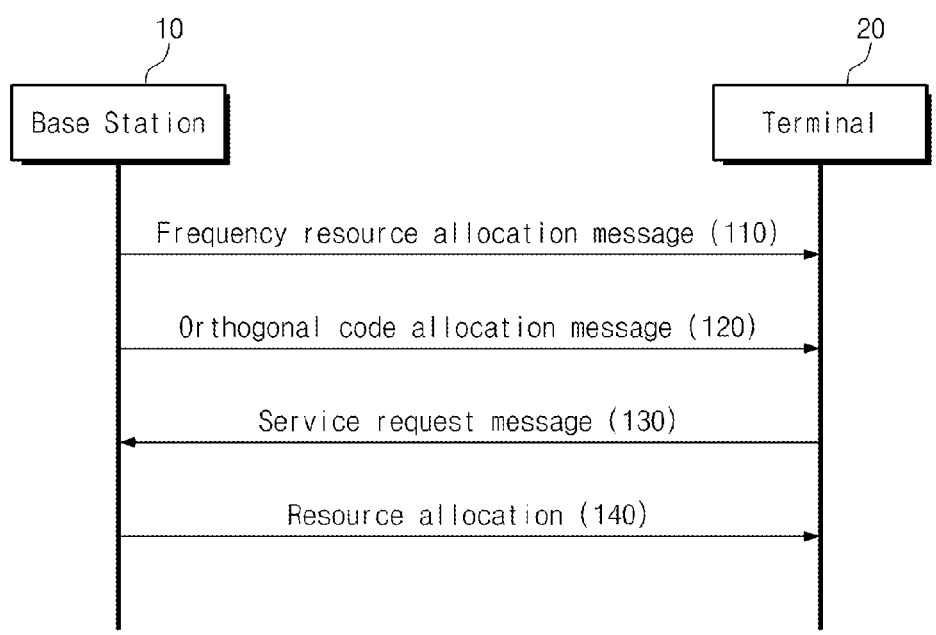
FIG. 2 is a signal flowchart illustrating a message transmitting/receiving operation between a base station and a terminal for resource allocation, according to an embodiment of the present invention.

FIG. 2 is a signal flowchart illustrating a message transmitting/receiving operation between a base station and a terminal for resource allocation, according to an embodiment of the present invention.

Referring to FIG. 2, the communication system includes the base station 10 and the terminal 20.

In operation S110, the base station 10 transmits a frequency resource allocation message for allocation of a frequency resource. The base station 10 may allocate the frequency resource, which is used to transmit a service request message, to the terminal 20.

In operation S120, the base station 10 transmits an orthogonal code allocation message for allocation of an orthogonal code to the terminal 20. Herein, the orthogonal code allocated to the terminal 20 is orthogonal to another orthogonal code allocated to another terminal. The base station 10 may allocate an orthogonal code set to the terminal 20. The orthogonal code set includes a plurality of orthogonal codes, at least one of which is orthogonal to at least one of orthogonal codes included in another orthogonal code set.

In operation S130, when there is data to be transmitted to the base station 10, the terminal 20 transmits a service request message, which requests allocation of a resource for data transmission, to the base station 10. The terminal 20 may transmit the service request message with a frequency resource allocated by the base station 10. Also, the terminal 20 calculates a sub frame for a service request with an orthogonal code set allocated by the base station 10 to generate it.

In operation S140, when the service request message is received, the base station 10 allocates a resource to the terminal 20 that has transmitted the service request message. Herein, the allocated resource is a resource for the data transmission of the terminal 20.

Figure 3:
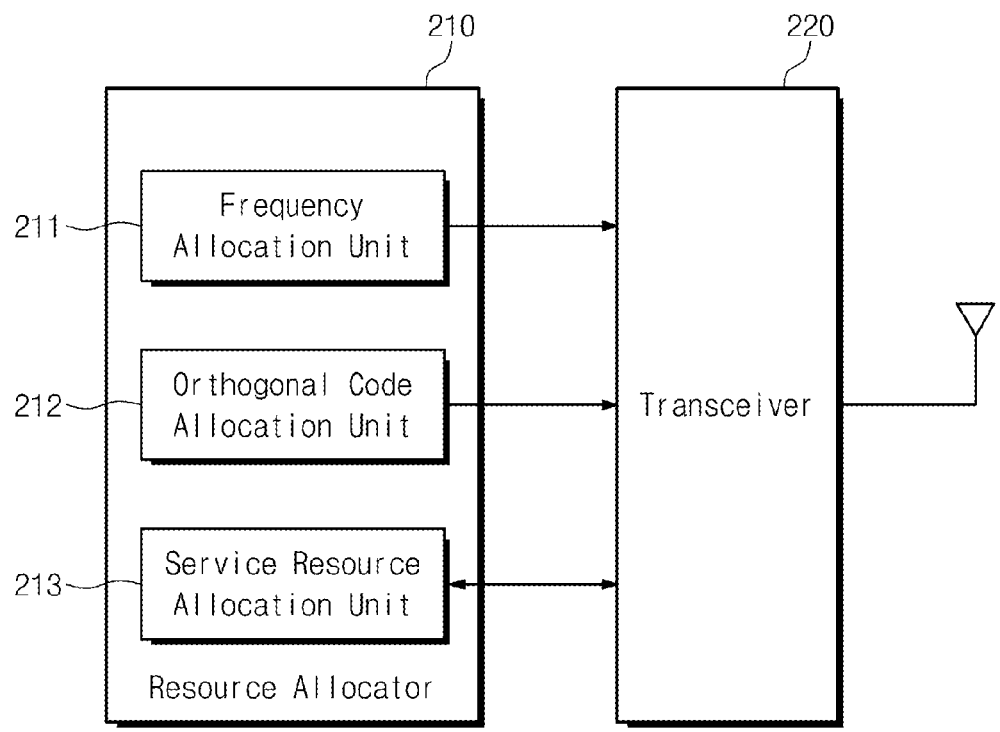
FIG. 3 is a block diagram illustrating a base station according to an embodiment of the present invention.

FIG. 3 is a block diagram illustrating a base station according to an embodiment of the present invention.

Referring to FIG. 3, the base station 10 includes a resource allocator 210 and a transceiver 220. Herein, the resource allocator 210 includes a frequency allocation unit 211, an orthogonal code allocation unit 212, and a service resource allocation unit 213.

The frequency allocation unit 211 allocates a frequency resource to a terminal. Herein, the frequency allocation unit 211 transmits the allocated frequency resource to a corresponding terminal through the transceiver 220.

The orthogonal code allocation unit 212 generates an orthogonal code index table including a plurality of orthogonal code combinations. The orthogonal code allocation unit 212 allocates one of the orthogonal code combinations included in the orthogonal code index table to each terminal, to which a frequency resource has been allocated for a service request thereof, so as not to multiply be allocated. Herein, the allocated frequency resource is transmitted to a corresponding terminal through the transceiver 220.

Herein, at least one of orthogonal codes included in the orthogonal code combination is orthogonal to at least one of orthogonal codes included in an orthogonal code combination allocated to another terminal.

The service resource allocation unit 213 allocates a service resource for the data transmission of a terminal. The service resource allocation unit 213 may allocate a service resource to a corresponding terminal in response to reception of a service request message from a terminal. Herein, the service resource is a resource that is used for transmitting data in a terminal.

The transceiver 220 transmits/receives a message to/from terminals.

Figure 4:
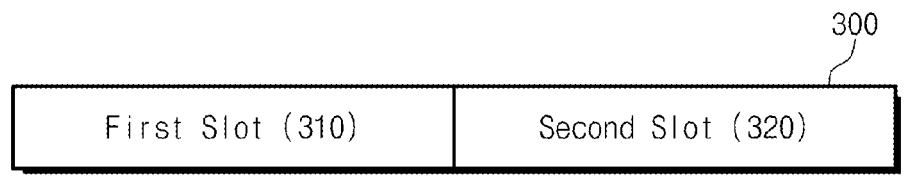
FIG. 4 is a diagram illustrating a sub frame structure for a service request, according to an embodiment of the present invention.

FIG. 4 is a diagram illustrating a sub frame structure for a service request, according to an embodiment of the present invention.

Referring to FIG. 4, as an example, the sub frame 300 may include two slots 310 and 330.

The sub frame 300 is a frame that is used for a terminal to request service to a base station.

Each of the first and second slots 310 and 320 may be configured with seven symbols. Herein, the seven symbols are calculated with an orthogonal code.

The base station 10 may allocate an orthogonal code combination including two orthogonal codes to each terminal. Herein, at least one of the orthogonal codes included in the orthogonal code combination is orthogonal to at least one of orthogonal codes included in another orthogonal code combination.

Therefore, a result value of a cross-correlation calculation is 1, between orthogonal codes that are orthogonal to each other.

Accordingly, the base station 10 may allow a service request message to be robust to interference.

Figures 5, 6:
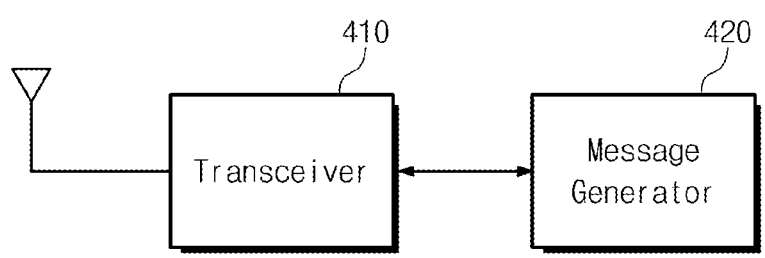
FIG. 5 is a diagram showing an orthogonal code index table according to an embodiment of the present invention.
FIG. 6 is a block diagram illustrating a terminal according to an embodiment of the present invention.

FIG. 5 is a diagram showing an orthogonal code index table according to an embodiment of the present invention.

Referring to FIG. 5, the orthogonal code index table includes two orthogonal codes.

It is assumed that the orthogonal code index table uses three orthogonal code indexes of 0, 1, and 2.

Each of Tables 1 and 2 below shows an orthogonal code index and an orthogonal code corresponding to the orthogonal code index.

TABLE 1

| Orthogonal code index | Orthogonal code |
|---|---|
| 0 | [+1 +1 +1 +1] |
| 1 | [+1 −1 +1 −1] |
| 2 | [+1 −1 −1 +1] |

TABLE 2

| Orthogonal code index | Orthogonal code |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

The orthogonal codes of the orthogonal code index are orthogonal to each other.

The orthogonal code index table generated by the orthogonal code allocation unit 212 allows at least one of indexes to be orthogonal to another index.

FIG. 6 is a block diagram illustrating a terminal according to an embodiment of the present invention.

Referring to FIG. 6, the terminal 20 includes a transceiver 410 and a message generator 420.

The message generator 420 generates a message that is transmitted/received to/from the base station 10. The message generator 420 may generate a service request message, for example, generate the service request message with an orthogonal code allocated by the base station 10 when generating the service request message.

FIG. 7 is a flowchart illustrating an operation of a base station according to an embodiment of the present invention.

Referring to FIG. 7, in operation S511, the frequency allocation unit 211 determines whether there is a terminal to which a resource for a service request will be allocated.

When the determined result of operation S511 shows that there is no terminal to which the resource for the service request will be allocated, the frequency allocation unit 211 proceeds to operation S520.

When the determined result of operation S511 shows that there is the terminal to which the resource for the service request will be allocated, the frequency allocation unit 211 proceeds to operation S521.

In operation S512, the frequency allocation unit 211 checks whether a frequency resource has been allocated to a corresponding terminal.

When the frequency resource has not been allocated to the corresponding terminal as the checked result of operation S512, the frequency allocation unit 211 proceeds to operation S513.

In operation S513, the frequency allocation unit 211 allocates a frequency resource, which is used to transmit a service request message, to the corresponding terminal.

When the frequency resource has been allocated to the corresponding terminal as the checked result of operation S512, the frequency allocation unit 211 proceeds to operation S514.

In operation S514, the orthogonal code allocation unit 212 determines whether there is an orthogonal code combination.

When the determined result of operation S514 shows that there is no orthogonal code combination, the orthogonal code allocation unit 212 proceeds to operation S515.

In operation S515, the orthogonal code allocation unit 212 generates an orthogonal code index table including a new orthogonal code combination.

When the determined result of operation S514 shows that there is the orthogonal code combination, the orthogonal code allocation unit 212 proceeds to operation S516.

In operation S516, the orthogonal code allocation unit 212 allocates an orthogonal code combination to a terminal. Herein, the orthogonal code combination includes at least one orthogonal code that is orthogonal to that of another orthogonal code combination.

In operation S517, the orthogonal code allocation unit 212 deletes the allocated orthogonal code combination from the orthogonal code index table.

In operation S518, the orthogonal code allocation unit 212 checks whether there is the remaining orthogonal code combination.

When the checked result of operation S518 shows that there is not the remaining orthogonal code combination, the orthogonal code allocation unit 212 proceeds to operation S519.

In operation S519, the orthogonal code allocation unit 212 deletes the frequency resource.

When the checked result of operation S518 shows that there is the remaining orthogonal code combination, the orthogonal code allocation unit 212 proceeds to operation S520.

In operation S520, the frequency allocation unit 211 determines whether to end a service request resource allocation operation.

When the service request resource allocation operation is not ended as the determined result of operation S520, the frequency allocation unit 211 proceeds to operation S511.

When the service request resource allocation operation is ended as the determined result of operation S520, the frequency allocation unit 211 ends the service request resource allocation operation.

In embodiments of the present invention, the base station receives a service request message for service request from a terminal, and a resource is allocated with an orthogonal code. Accordingly, even when the base station receives respective service request messages from a plurality of terminals, the base station can receive the service request messages without interference therebetween.

According to embodiments of the present invention, by allocating a code orthogonal between the terminals for requesting service, interference due to service requests from the terminals can be minimized in the base station.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A base station comprising:
a transceiver communicating with a terminal;
a frequency allocation unit allocating a frequency resource to the terminal through the transceiver; and
an orthogonal code allocation unit generating an orthogonal code index table having multiple columns comprising a plurality of orthogonal code index combinations, each of the orthogonal code index combinations being a combination of a plurality of orthogonal codes, and allocating one of the orthogonal code combinations comprised in the orthogonal code index table to each terminal, to which the frequency resource has been allocated for a service request of the terminal, through the transceiver, such that the terminal does not have the same orthogonal code combination as other terminals, wherein at least one of a plurality of orthogonal codes comprised in the orthogonal code combination is orthogonal to at least one of a plurality of orthogonal codes comprised in an orthogonal code combination allocated to another terminal.

2. The base station of claim 1, wherein the orthogonal codes comprised in the orthogonal code combination corresponds to a plurality of slots in a sub frame for a service request from a terminal, respectively.

3. The base station of claim 1, wherein,
the orthogonal code comprises at least one of first to third orthogonal codes,
the first orthogonal code is [+1 +1 +1 +1],
the second orthogonal code is [+1 −1 +1 −1], and
the third orthogonal code is [+1 −1 −1 +1].

4. The base station of claim 1, wherein,
the orthogonal code comprises at least one of first to third orthogonal codes,
the first orthogonal code is $[1\ 1\ 1]$,
the second orthogonal code is $[1\ e^{j2\pi/3}\ e^{j4\pi/3}]$, and
the third orthogonal code is $[1\ e^{j4\pi/3}\ e^{j2\pi/3}]$.

5. The base station of claim 1, wherein the orthogonal code allocation unit generates the orthogonal code combinations comprised in the orthogonal code index table for the orthogonal code combinations to comprise different orthogonal codes.

6. A resource allocation method of a base station, the resource allocation method comprising:
allocating a frequency resource to a terminal;
generating an orthogonal code index table having multiple columns comprising a plurality of orthogonal code index combinations, each of the orthogonal code index combinations being a combination of a plurality of orthogonal codes; and
allocating one of the orthogonal code combinations comprised in the orthogonal code index table to each terminal, to which the frequency resource has been allocated for a service request of the terminal, through the transceiver, such that the terminal does not have the same orthogonal code combination as other terminals,
wherein at least one of a plurality of orthogonal codes comprised in the orthogonal code combination is orthogonal to at least one of a plurality of orthogonal codes comprised in an orthogonal code combination allocated to another terminal.

7. The resource allocation method of claim 6, wherein the orthogonal codes comprised in the orthogonal code combination corresponds to a plurality of slots in a sub frame for a service request from a terminal, respectively.

8. The resource allocation method of claim 6, wherein,
the orthogonal code comprises at least one of first to third orthogonal codes,
the first orthogonal code is [+1 +1 +1 +1],
the second orthogonal code is [+1 −1 +1 −1], and
the third orthogonal code is [+1 −1 −1 +1].

9. The resource allocation method of claim 6, wherein,
the orthogonal code comprises at least one of first to third orthogonal codes,
the first orthogonal code is $[1\ 1\ 1]$,
the second orthogonal code is $[1\ e^{j2\pi/3}\ e^{j4\pi/3}]$, and
the third orthogonal code is $[1\ e^{j4\pi/3}\ e^{j2\pi/3}]$.

10. The resource allocation method of claim 6, wherein the generating of an orthogonal code index table comprises generating the orthogonal code combinations comprised in the orthogonal code index table for the orthogonal code combinations to comprise different orthogonal codes.

* * * * *